UNITED STATES PATENT OFFICE.

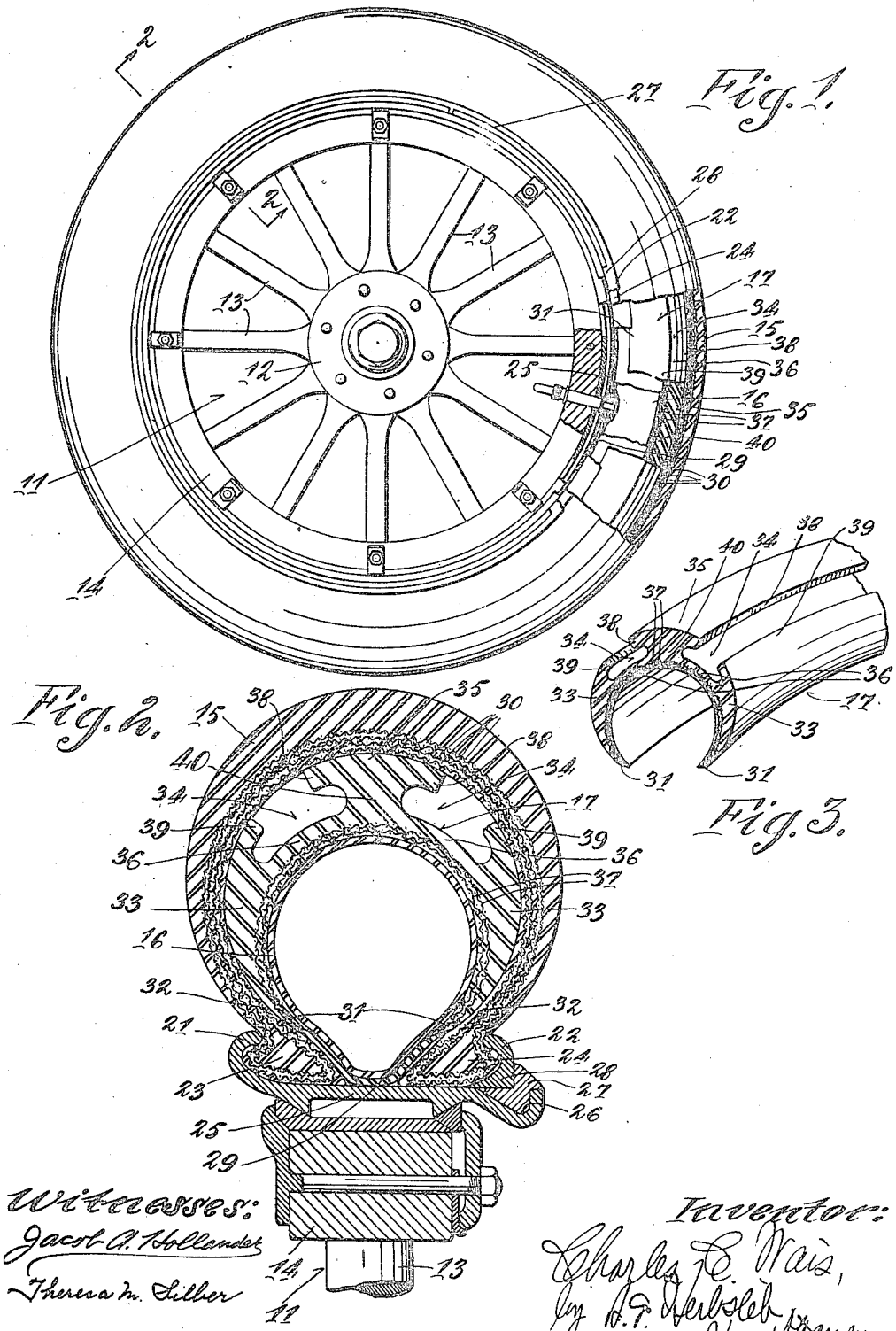

CHARLES C. WAIS, OF CINCINNATI, OHIO.

VEHICLE-WHEEL.

1,253,752.

Specification of Letters Patent.     Patented Jan. 15, 1918.

Application filed December 24, 1914.   Serial No. 878,968.

*To all whom it may concern:*

Be it known that I, CHARLES C. WAIS, a citizen of the United States, residing at Cincinnati, in the county of Hamilton and State of Ohio, have invented certain new and useful Improvements in Vehicle-Wheels, of which the following is a specification.

It is the object of my invention to provide a resilient armor between the inner pneumatic member and the outer casing or tread-member of a pneumatic tire so as to protect the inner pneumatic member from puncture, to provide an annular cushion between the inner member and the tread-member of the pneumatic tire which coacts with the inner pneumatic member in cushioning the tire, and to provide a cushion of novel construction for the tread-member.

The invention will be further readily understood from the following description and claims, and from the drawings, in which latter:

Figure 1 is a side elevation of my improved device partly broken away for better illustration of the parts.

Fig. 2 is a cross-section on the line 2—2 of Fig. 1; and,

Fig. 3 is a perspective view of a section of the armor.

11 represents the body of the vehicle-wheel which may comprise the hub 12, spokes 13 and the felly 14.

The outer casing or tread-member of the tire is represented at 15. The inner member or pneumatic tube of the tire is represented at 16. Within the casing there is a cushion-member 17, shown interposed between the tread-member and inner tube of the tire.

In the form shown, the casing is held in place by means of annular flanges 21, 22, which coact with the annular bases 23, 24, of the casing. The annular flange 21 extends integrally from an annular band 25 which is provided with an annular groove 26 in which an annular split-ring 27 is received. The annular flange 22 is on an annular integral ring 28 which is held about the annular band 25 by means of the split-ring 27.

A usual annular apron 29 is received between the bases of the casing and the inner tube for protecting the pneumatic tube of the tire. The inner portion of the casing preferably has fabric strips 30 embedded therein. The annular band 25 is suitably attached to the body of the wheel.

The cushion-member 17 is formed crescent-shaped in cross-section, with the horns 31 of the crescent projecting inwardly toward each other, the inner ends of these horns being supported by the inwardly sloping portions 32 of the casing when the parts are assembled. The horns gradually increase in cross-section toward the side portions of the cushion-member 17, as shown at 33.

At each side of the outer annular peripheral portion of the cushion-member, it is provided with recesses 34, which preferably extend annularly between the horns 31 and the base 35 of the cushion-member. This base is at the outer annular portion of the cushion-member. An inner web 36 of the cushion-member connects the base with each of the horns, and the inner portion of the cushion-member preferably has fabric strips 37, for instance, canvas, embedded therein for strengthening the same and strengthening the webs 36. The cushion-member is preferably of resilient material, for instance, rubber. At the recesses 34, it is provided with laterally extending wings 38, 39, formed in the body of the cushion-member and forming resilient wings. The outer annular portion of the cushion-member is somewhat T-shaped in cross-section, the shank 40 enhancing the resilient properties of the cushion-member, the wings 38 extending laterally at each side of said shank.

When the pressure of the load is exerted upon the cushion-member 17, the tendency is to partly compress the base 35, and to spread the cushion-member laterally, the resistance to the weight of the load being further received upon the inwardly sloping portions 32 of the casing.

The cushion-member 17 acts as a protecting armor for the inner tube.

My invention provides a pneumatic tire in which the inner tube is removed from the casing of the tire by an interposed resilient armor which forms a cushion-member for the tire, and protects the inner tube from puncture by penetration of foreign objects, and from blow-outs. The outer annular portion of this armor is so formed as to provide resiliency between the inner tube and the casing, and the armor is so formed in cross-section as to receive support at its inner portions upon the base portions 32 of the casing, the armor being further provided with resilient wings which aid in the cushioning effect thereof. The inner tube further acts to spread the armor and the casing so that the casing is firmly held in the usual detachable mounting for the outer casing or tread-member, one form of which is shown in the drawings by the flanges 21, 22. The outer recesses in the armor especially when annularly arranged serve as cooling agents for the tire.

Having thus fully described my invention, what I claim as new and desire to secure by Letters Patent, is:

1. In a vehicle wheel, the combination of an annular tire retaining means, a casing having portions coacting with said retaining means and extending toward each other, an annular inflatable pneumatic tube in said casing, and an annular cushioning armor interposed between said annular inflatable pneumatic tube and casing substantially crescent-shaped in cross-section, the horns of the crescent extending toward each other and overlapped substantially by said pneumatic tube when inflated, and the said annular cushioning armor provided with outer annularly arranged recesses for forming said armor with a tread portion which is substantially T-shaped in cross-section and with webs which are outwardly curved in cross-section connecting the base of said T-shaped tread-portion with said horns, the sides of said armor arranged to be spread by pressure on said tread portion resisted by said horns.

2. In a vehicle wheel, the combination of an annular casing having inner portions extending toward each other, an inner annular inflatable pneumatic member, and an annular cushion-member in said casing having an annularly arranged peripheral portion which is substantially T-shaped in cross-section for forming a resilient stem and resilient wings whose outer ends extend integrally laterally from said stem, said annular cushioning member further having annularly arranged horns at its inner portions supported by said inner portions of said casing and connected with said substantially T-shaped portion by means of resilient webs, and the said webs and said resilient wings being outwardly curved in cross-section for spreading the sides of said armor by pressure on said annularly arranged peripheral portion.

In testimony whereof, I have hereunto signed my name in the presence of two subscribing witnesses.

CHARLES C. WAIS.

Witnesses:
 COLEMAN AVERY,
 THERESA M. SILBER.